United States Patent
Guo et al.

(10) Patent No.: US 12,104,463 B2
(45) Date of Patent: Oct. 1, 2024

(54) MAGNETOFLUID ENHANCED ELECTROMAGNETIC HEATING DEVICE AND METHOD FOR PREVENTING AND TREATING SECONDARY HYDRATES AROUND WELL

(71) Applicant: INSTITUTE OF GEOLOGY AND GEOPHYSICS, CHINESE ACADEMY OF SCIENCES, Beijing (CN)

(72) Inventors: Guangjun Guo, Beijing (CN);
Changqian Cao, Beijing (CN);
Yongyou Yang, Beijing (CN);
Shuangchi Liu, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/113,367

(22) Filed: Feb. 23, 2023

(65) Prior Publication Data
US 2023/0366294 A1 Nov. 16, 2023

(30) Foreign Application Priority Data
May 12, 2022 (CN) .......................... 202210513352.1

(51) Int. Cl.
*E21B 36/04* (2006.01)
*E21B 41/00* (2006.01)
*E21B 43/26* (2006.01)

(52) U.S. Cl.
CPC .......... *E21B 36/04* (2013.01); *E21B 41/0099* (2020.05); *E21B 43/26* (2013.01)

(58) Field of Classification Search
CPC .. E21B 41/0099; E21B 43/01; E21B 43/2401; E21B 36/04; E21B 43/26; E21B 36/005; E21B 17/028; E21B 36/003
See application file for complete search history.

(56) References Cited

PUBLICATIONS

Translation of CN106481339 (Year: 2017).*
Translation of CN109630074 (Year: 2019).*
(Continued)

*Primary Examiner* — Zakiya W Bates

(57) ABSTRACT

A magnetofluid enhanced electromagnetic heating device and method for preventing and treating secondary hydrates around a well are provided. When exploiting natural gas hydrates by depressurization, secondary hydrates or ice can form due to the decreasing temperature around the well, so that gas migration in sediment is blocked, and the gas production is reduced. According to this disclosure, a coil is arranged outside a casing pipe to generate an alternating electromagnetic field radiated to sediment. As a result, magnetite nanoparticles naturally contained in the sediment generate magnetothermal effect to heat the sediment. Additionally, the magnetofluid containing the ferromagnetic nanoparticles can be injected together with fracturing fluid during hydraulic fracturing of the reservoir, so that the magnetothermal effect of the sediment is further enhanced. Thus, secondary hydrates or ice can be prevented from forming around the well so that the exploitation efficiency of natural gas hydrates is improved.

16 Claims, 1 Drawing Sheet

(56) References Cited

PUBLICATIONS

Translation of CN112240188 (Year: 2021).*
Translation of CN114427412 (Year: 2022).*
Translation of CN209586341 (Year: 2019).*
Translation of CN211777364 (Year: 2020).*

* cited by examiner

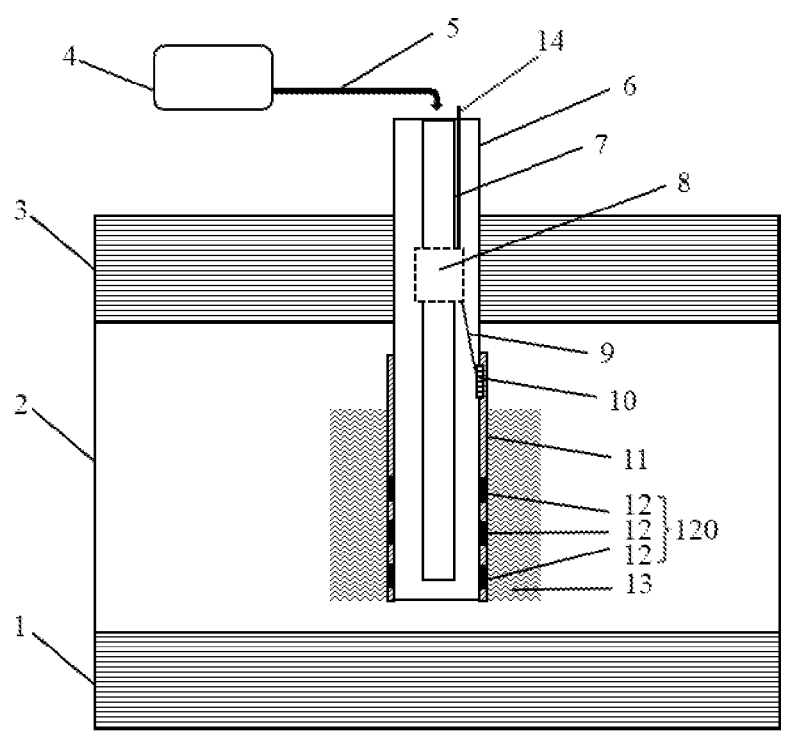

MAGNETOFLUID ENHANCED ELECTROMAGNETIC HEATING DEVICE AND METHOD FOR PREVENTING AND TREATING SECONDARY HYDRATES AROUND WELL

CROSS REFERENCE TO RELATED APPLICATION

This application claims benefit and priority of the Chinese Patent Application No. 202210513352.1, filed with China National Intellectual Property Administration (CNIPA) on May 12, 2022, the disclosure of which is incorporated by reference herein in its entirety as part of the present disclosure.

TECHNICAL FIELD

The present disclosure belongs to the field of natural gas hydrate exploitation.

BACKGROUND

Natural gas hydrates, commonly known as "burning ice", mainly exist in the seabed and permafrost areas on the continental margin, and are large in quantity of resources. Due to the lack of mature development technology, natural gas hydrates have not been exploited commercially on a large scale at present. Some trial exploitation methods, such as depressurization method, heat injection method, inhibitor injection method and $CO_2$ replacement method, have been explored only in Canada, USA, Japan and China. According to the depressurization method, the reservoir pressure is reduced by pumping out fluid in the wellbore, resulting in the decomposition of the natural gas hydrates into water and methane gas and recovering the water and methane gas. Due to low cost and high efficiency, depressurization method is a promising method for hydrate exploitation. In 2017 and 2020, two rounds of trial exploitation of natural gas hydrates are carried out by the depressurization method in China, and the world records of the longest continuous exploitation time (60 days before well shutdown) and the largest exploitation amount (300,000 $m^3$) are achieved. However, there are still a series of technical problems and challenges to be solved in the depressurization method.

The engineering geological problems in the exploitation of natural gas hydrates by the depressurization method must be considered, including reservoir instability, sand production, subsidence, landslide and other risks, as well as the flow assurance problems faced by long-term exploitation and the marine and atmospheric environmental problems possibly caused by the leakage of decomposed gas. In terms of flow assurance, "sand blockage" and/or "ice blockage" can block gas channels, so that the gas production is reduced, and even stops. Wherein, "ice blockage" is caused mainly due to the heat absorption of hydrate decomposition and throttling expansion when decomposed gas enters the wellbore, resulting in the temperature decrease (which can be lower than 0° C.) in the perforated section of wellbore and around the well. And then, the decomposed gas forms hydrates again (so-called "secondary hydrates") and even ice, so that the pores and fractured channels in the sediment are blocked.

To solve the blockage hazards of the secondary hydrates, hydrate inhibitor, electric heating, microwave heating and other technologies are usually used all over the world. However, at present, only the formation of secondary hydrates in the wellbore can be prevented, but the secondary hydrates in the reservoir sediment around the well cannot be effectively prevented and treated. The pressure in the wellbore is kept lower than the fluid pressure in the reservoir outside the wellbore during the hydrate exploitation process by using the depressurization method, and therefore, the inhibitor cannot be injected into the well surroundings. Electric heating and microwave heating technologies generally act on the inside of the wellbore, and their heat is difficultly sent to the outside of the wellbore. Therefore, remote heating through the wellbore becomes a key technical problem. Only if heat is transferred to the reservoir sediment around the wellbore, the potential heat absorption by "ice blockage" can be compensated in thermodynamics so that the temperature field around the wellbore cannot decrease into the hydrate phase area, and thus the formation of secondary hydrates and ice can be prevented.

The patent with the publication number of CN111188607A, and entitled "a synergistic exploitation method of natural gas hydrates through liquid $CO_2$ magnetofluid replacement and microwave heating", discloses a method to prepare magnetofluid by dispersing metal nanoparticles in liquid $CO_2$. The metal nanoparticles are dispersed into the natural gas hydrate reservoir by injecting the liquid $CO_2$ magnetofluid, and then the natural gas hydrates are heated and decomposed by microwave. The metal nanoparticles in the reservoir play a role in enhancing the microwave heating efficiency. At the same time, liquid $CO_2$ can also react with the natural gas hydrates for a replacement reaction to generate $CO_2$ hydrates and natural gas, so that the exploitation efficiency of hydrates can also be improved for a little bit.

The technical method aims to directly exploit natural gas hydrates, and the reservoir sediment outside the wellbore is remotely heated, but there are three obvious shortcomings. Firstly, the microwave generator in the above-mentioned patent is installed inside the wellbore. The stainless steel casing pipe wall forming the wellbore has a shielding effect on microwaves, so the microwave power reaching the reservoir is small, and the heating effect is not obvious. Secondly, the injected liquid $CO_2$ can be changed into high-pressure gaseous $CO_2$ in the reservoir, so that a large amount of latent heat of the sediment is absorbed, and the reservoir temperature is reduced. Therefore, the local low-temperature and high-pressure environment caused is actually not conducive to the decomposition of the natural gas hydrates. Thirdly, after a large amount of liquid $CO_2$ is injected, the rate of replacing hydrate methane by $CO_2$ is not high, so $CO_2$ flowing back from the reservoir and methane gas generated by hydrate decomposition are mixed together and jointly produced. In this case, gas separation is necessary to obtain the desired natural gas for hydrate exploitation, so that the exploitation cost is increased as another unfavorable factor.

SUMMARY

In order to solve the problems existing in the prior art, the present disclosure provides a magnetofluid enhanced electromagnetic heating device and method for preventing and treating secondary hydrates around a well. The device and the method are not used for large-scale decomposition of natural gas hydrates for continuous exploitation, but for continuous heating in a certain area around the well to prevent the formation of secondary hydrates or ice. Therefore, pore channels in the sediment are kept unblocked, and the problem of "ice blockage" can be solved, so that the exploitation efficiency of natural gas hydrates is improved.

In order to achieve the above purpose, the present disclosure adopts the following technical scheme.

The present disclosure firstly provides a magnetofluid enhanced electromagnetic heating device for preventing and treating secondary hydrates around a well, comprising a casing pipe for exploiting natural gas hydrates, a coil assembly and a high-frequency alternating current generator. The coil assembly is wound on the outside of the casing pipe, and the high-frequency alternating current generator is arranged inside the casing pipe. The high-frequency alternating current generator is connected with the coil assembly and configured for supplying power to the coil assembly.

Preferably, the coil assembly comprises a plurality of coils separated from each other, and each coil is separately connected with the high-frequency alternating current generator.

Specifically, the coil is shaped as a curve spiral disc. That is, the axis of the coil is perpendicular to the wall of the casing pipe, and the curved surface of the coil is fitted to the outer wall of the casing pipe.

Specifically, the device further comprises a lead and an interface. The lead and the interface have an auto-closing function so as to connect the high-frequency alternating current generator with the coil assembly by forming a circuit passing through the wall of casing pipe.

Preferably, a protective layer of an insulating material is wrapped outside the coil assembly.

The high-frequency alternating current generator is installed on an oil tube inside the casing pipe, and a power cable is brought in along the oil tube from the wellhead to connect the high-frequency alternating current generator.

The present disclosure further provides a magnetofluid enhanced electromagnetic heating method for preventing and treating secondary hydrates around a well, implemented by the above-mentioned device, comprising the following steps:

S1, implementing drilling engineering, putting a casing pipe into a stratum, and installing an oil tube;

S2, feeding ferromagnetic nanoparticles into reservoir sediment along with fracturing fluid; and S3, turning on the high-frequency alternating current generator to supply power to the coil assembly which generates an alternating electromagnetic field, and heating the casing pipe and the sediment around it.

Wherein, the S1 further includes a process of connecting the high-frequency alternating current generator and the coil assembly. Specifically, after completing the cementing and completion operations, installing the oil tube feeding a conventional cable and the high-frequency alternating current generator into the top of a target section of casing pipe through the oil tube, and then releasing the lead to connect with the interface on the inner wall of the casing pipe.

Further, a process of feeding ferromagnetic nanoparticles into reservoir sediment comprises, after installing the oil tube, adding magnetofluid containing the ferromagnetic nanoparticles into the fracturing fluid, accompanied by hydraulic fracturing or slotting operation, so that the ferromagnetic nanoparticles enter the reservoir sediment around the well along with the fracturing fluid. Preferably, the ferromagnetic nanoparticles are magnetite nanoparticles.

The present disclosure has the following beneficial effects:

Firstly, the ferromagnetic nanoparticles are fed into the reservoir sediment along with fracturing fluid, and improve the ferromagnetic property of the sediment, so that the magnetocaloric effect and the heating capacity under the alternating magnetic field can be enhanced.

Secondly, the coils are wound on the outer side of the casing pipe and contact with the reservoir sediment directly, and an alternating electromagnetic field generated by the coils is no longer shielded by the casing pipe. Therefore, the alternating electromagnetic field remotely acts on the ferromagnetic nanoparticles, and the sediment around the well is heated by utilizing the magnetocaloric effect.

Thirdly, the resistance heat generated by the coils can heat the casing pipe and the directly contacted reservoir sediment in a short distance.

Fourthly, the coil assembly comprises a plurality of separated coils. Even if some of the coils are damaged in the casing pipe perforation stage, the other coils can still play a heating role.

Fifthly, power can be supplied from the inside to the outside of the casing pipe.

BRIEF DESCRIPTION OF THE DRAWINGS

The present disclosure is further explained with reference to the attached figures. The attached figures of the present disclosure only schematically illustrate and explain the present disclosure, but do not limit the scope of the present disclosure.

FIG. 1 is a structural schematic diagram of the device in the present disclosure.

REFERENCE SIGNS

1, underlying stratum; 2, natural gas hydrate reservoir; 3, overlaying stratum; 4, magnetofluid; 5, injection reservoir accompanying fracturing fluid; 6, casing pipe; 7, oil tube; 8, high-frequency alternating current generator; 9, lead; 10, lead interface; 11, protective layer; 12, coil; 13, sediment heating area around well; 14, power supply cable; and 120, coil assembly.

DETAILED DESCRIPTION OF THE EMBODIMENTS

The following detailed description is made with reference to specific embodiments, but the protection scope of the present disclosure is not limited by the specific embodiments.

Firstly, the present disclosure provides a magnetofluid enhanced electromagnetic heating device for preventing and treating secondary hydrates around a well. As shown in FIG. 1, the device comprises a casing pipe 6 for exploiting natural gas hydrates. The casing pipe 6 passes through the overlaying stratum 3 and is inserted into a natural gas hydrate reservoir 2. A coil assembly 120 is wound on the outer side of the casing pipe 6. A high-frequency alternating current generator is arranged inside the casing pipe. The high-frequency alternating current generator is connected with the coil assembly 120 to supply power for the coil assembly 120.

Specifically, the coil assembly 120 comprises a plurality of coils 12 separated from one another. Each coil 12 is separated connected with the high-frequency alternating current generator. Multiple groups of coils 12 are arranged. Due to the consideration that the coils can be damaged in the wellbore perforation stage, even if individual coils are damaged, the normal operation of the whole device is not affected. A power supply circuit of the coil is concentrated on the upper part of the casing pipe 6. The lead 9 passes the casing pipe through the lead interface 10 on the inner wall of the casing pipe, and is connected with the power supply wire of the coil. The lead 9 and the lead interface 10 have an auto-closing function.

A protective layer 11 is wrapped outside the coil assembly 120. The protective layer 11 is used for fixing and protecting the coils and preventing the coils from being damaged when the casing pipe 6 is fed into the borehole. Specifically, the protective layer 11 is made of an insulating material.

The high-frequency alternating current generator 8 is installed on an oil tube 7 inside the casing pipe 6, and a power supply cable 14 of the high-frequency alternating current generator is brought in from the wellhead along the oil tube. The high-frequency alternating current generator 8 is used for supplying power for the coils 12, so that the coils 12 generate an alternating electromagnetic field.

The present disclosure further provides a magnetofluid enhanced electromagnetic heating method, using the above-mentioned device, comprising the following steps:

firstly, implementing drilling engineering, and putting a casing pipe 6 wrapped with the coils 12 into the stratum;

secondly, after completing the cementing and completion operations, installing an oil tube, feeding the conventional cable and the high-frequency alternating current generator into the top of the target casing pipe through the oil tube, and then releasing the lead 9 to connect with the lead interface 10 on the inner wall of the casing pipe;

thirdly, after installing the oil tube, adding magnetofluid 4 into the fracturing fluid, accompanied by hydraulic fracturing or slotting operation 5, so that ferromagnetic nanoparticles enter the reservoir sediment 2 around the well together with the fracturing fluid;

fourthly, turning on the high-frequency alternating current generator 8 to supply power for the coil assembly 120 which generates an alternating electromagnetic field outside the casing pipe 6 so that the ferromagnetic nanoparticles (containing the naturally distributed ferromagnetic nanoparticles and the ferromagnetic nanoparticles injected by magnetofluid) in the reservoir sediment generate heat, and heating the sediment 13 around the well and the casing pipe; simultaneously heating the coils, so that the casing pipe 6 is heated; and fifthly, under the continuous heat supply, eliminating the risk of "ice blockage" and ensuring the stable and high yield of natural gas hydrate exploitation due to the fact that no secondary hydrates or ice can be formed in the sediment 13 around the well.

According to the method, firstly the coils are wrapped outside the casing pipe, and power is supplied for the coils outside the casing pipe from a high-frequency alternating current generator inside the casing pipe to generate a specific-frequency electromagnetic field radiating to the stratum sediment. Under the action of the electromagnetic field, magnetite nanoparticles naturally contained in the stratum sediment generate oscillating motion, and the aim of heating the stratum around the well is achieved due to heat generated by friction. The coils are wound outside the casing pipe, and electromagnetic radiation of the coils is no longer shielded by the casing pipe. Therefore, the electromagnetic radiation can remotely act on the reservoir sediment around the well. In addition, in the hydraulic fracturing or slotting stage of the reservoir, the magnetofluid containing the ferromagnetic nanoparticles can be injected along with fracturing fluid, so that the ferromagnetic property of the sediment is increased, and the heating effect is further enhanced. Liquid $CO_2$ magnetic fluid does not need to be prepared, so that heat absorption of injected liquid $CO_2$ and adverse side effects of mixing with natural gas are avoided. Furthermore, the resistance heat generated by the coils mentioned in the present disclosure is not wasted, and the effect of heating the wellbore can be achieved. In conclusion, electric energy is converted into heat energy which can heat the casing pipe itself and the sediment reservoir outside the casing pipe, secondary hydrates and ice are effectively prevented or eliminated, and the problem of "ice blockage" can be solved, so that the exploitation efficiency of natural gas hydrates is improved.

The above is only the preferred embodiment of the present disclosure, and is only illustrative rather than restrictive. Those skilled in the art understand that various changes, modifications and even equivalents can be made within the spirit and scope of the claims, but all fall within the scope of protection of the present disclosure.

What is claimed is:

1. A magnetofluid enhanced electromagnetic heating device for preventing and treating secondary hydrates around a well, comprising a casing pipe for exploiting natural gas hydrates, a coil assembly and a high-frequency alternating current generator, wherein the coil assembly is wound on an outer side of the casing pipe, the high-frequency alternating current generator is arranged inside the casing pipe, and the high-frequency alternating current generator is connected with the coil assembly and configured for supplying power to the coil assembly; and wherein the coil assembly comprises a plurality of coils separated from each other, and each coil is separately connected with the high-frequency alternating current generator.

2. The magnetofluid enhanced electromagnetic heating device for preventing and treating secondary hydrates around a well according to claim 1, wherein each coil of the plurality of coils is shaped as a curve spiral disc, an axis of each coil is perpendicular to a side wall of the casing pipe, and a curved surface of each coil is fitted to the outer wall of the casing pipe.

3. A magnetofluid enhanced electromagnetic heating method for preventing and treating secondary hydrates around a well, implemented by the device according to claim 2, comprising the following steps:

S1, implementing drilling engineering, putting a casing pipe into a stratum, and installing an oil tube;

S2, feeding ferromagnetic nanoparticles into reservoir sediment along with fracturing fluid; and S3, turning on the high-frequency alternating current generator to supply power to the coil assembly which generates an alternating electromagnetic field, and heating the casing pipe and sediment around the well.

4. The magnetofluid enhanced electromagnetic heating method for preventing and treating secondary hydrates around a well according to claim 3, wherein the step S1 further comprises a process of connecting the high-frequency alternating current generator and the coil assembly, specifically, the process comprises, after completing the cementing and completion operations, installing the oil tube, feeding a conventional cable and the high-frequency alternating current generator into a top of a target casing pipe through the oil tube, and then releasing the lead to connect with the interface on the inner wall of the casing pipe.

5. The magnetofluid enhanced electromagnetic heating method for preventing and treating secondary hydrates around a well according to claim 3, wherein a process of feeding ferromagnetic nanoparticles into reservoir sediment comprises, after installing the oil tube, adding magnetofluid into the fracturing fluid, accompanied by hydraulic fracturing or slotting operation, so that ferromagnetic nanoparticles enter the reservoir sediment around the well together with the fracturing fluid.

6. The magnetofluid enhanced electromagnetic heating device for preventing and treating secondary hydrates around a well according to claim 1, further comprising a lead and an interface, wherein the lead and the interface have an auto-closing function, and so as to connect the high-frequency alternating current generator with the coil assembly by forming a circuit passing through the wall of casing pipe.

7. A magnetofluid enhanced electromagnetic heating method for preventing and treating secondary hydrates around a well, implemented by the device according to claim 6, comprising the following steps:
   S1, implementing drilling engineering, putting a casing pipe into a stratum, and installing an oil tube;
   S2, feeding ferromagnetic nanoparticles into reservoir sediment along with fracturing fluid; and
   S3, turning on the high-frequency alternating current generator to supply power to the coil assembly which generates an alternating electromagnetic field, and heating the casing pipe and sediment around the well.

8. The magnetofluid enhanced electromagnetic heating method for preventing and treating secondary hydrates around a well according to claim 7, wherein the step S1 further comprises a process of connecting the high-frequency alternating current generator and the coil assembly, specifically, the process comprises, after completing the cementing and completion operations, installing the oil tube, feeding a conventional cable and the high-frequency alternating current generator into a top of a target casing pipe through the oil tube, and then releasing the lead to connect with the interface on the inner wall of the casing pipe.

9. The magnetofluid enhanced electromagnetic heating method for preventing and treating secondary hydrates around a well according to claim 7, wherein a process of feeding ferromagnetic nanoparticles into reservoir sediment comprises, after installing the oil tube, adding magnetofluid into the fracturing fluid, accompanied by hydraulic fracturing or slotting operation, so that ferromagnetic nanoparticles enter the reservoir sediment around the well together with the fracturing fluid.

10. The magnetofluid enhanced electromagnetic heating device for preventing and treating secondary hydrates around a well according to claim 1, wherein a protective layer of an insulating material is wrapped outside the coil assembly.

11. A magnetofluid enhanced electromagnetic heating method for preventing and treating secondary hydrates around a well, implemented by the device according to claim 10, comprising the following steps:
   S1, implementing drilling engineering, putting a casing pipe into a stratum, and installing an oil tube;
   S2, feeding ferromagnetic nanoparticles into reservoir sediment along with fracturing fluid; and
   S3, turning on the high-frequency alternating current generator to supply power to the coil assembly which generates an alternating electromagnetic field, and heating the casing pipe and sediment around the well.

12. The magnetofluid enhanced electromagnetic heating device for preventing and treating secondary hydrates around a well according to claim 1, wherein the high-frequency alternating current generator is installed on an oil tube inside the casing pipe, and a power supply cable of the high-frequency alternating current generator is brought in from a wellhead along the oil tube.

13. A magnetofluid enhanced electromagnetic heating method for preventing and treating secondary hydrates around a well, implemented by the device according to claim 12, comprising the following steps:
   S1, implementing drilling engineering, putting a casing pipe into a stratum, and installing an oil tube;
   S2, feeding ferromagnetic nanoparticles into reservoir sediment along with fracturing fluid; and
   S3, turning on the high-frequency alternating current generator to supply power to the coil assembly which generates an alternating electromagnetic field, and heating the casing pipe and sediment around the well.

14. A magnetofluid enhanced electromagnetic heating method for preventing and treating secondary hydrates around a well, implemented by the device according to claim 1, comprising the following steps:
   S1, implementing drilling engineering, putting a casing pipe into a stratum, and installing an oil tube;
   S2, feeding ferromagnetic nanoparticles into reservoir sediment along with fracturing fluid; and
   S3, turning on the high-frequency alternating current generator to supply power to the coil assembly which generates an alternating electromagnetic field, and heating the casing pipe and sediment around the well.

15. The magnetofluid enhanced electromagnetic heating method for preventing and treating secondary hydrates around a well according to claim 14, wherein the step S1 further comprises a process of connecting the high-frequency alternating current generator and the coil assembly, specifically, the process comprises, after completing the cementing and completion operations, installing the oil tube, feeding a conventional cable and the high-frequency alternating current generator into a top of a target casing pipe through the oil tube, and then releasing the lead to connect with the interface on the inner wall of the casing pipe.

16. The magnetofluid enhanced electromagnetic heating method for preventing and treating secondary hydrates around a well according to claim 14, wherein a process of feeding ferromagnetic nanoparticles into reservoir sediment comprises, after installing the oil tube, adding magnetofluid into the fracturing fluid, accompanied by hydraulic fracturing or slotting operation, so that ferromagnetic nanoparticles enter the reservoir sediment around the well together with the fracturing fluid.

* * * * *